United States Patent [19]
Fortenberry et al.

[11] Patent Number: 6,101,485
[45] Date of Patent: Aug. 8, 2000

[54] ELECTRONIC SOLICITATIONS FOR INTERNET COMMERCE

[75] Inventors: Keith N. Fortenberry; Robert M. Szabo; James J. Toohey, all of Boca Raton, Fla.; Marshall L. Zimmerman, Columbus, Ohio; Raymond Yee, Coral Springs, Fla.

[73] Assignee: International Business Machines Corporation, Armonk, N.Y.

[21] Appl. No.: 09/048,518

[22] Filed: Mar. 26, 1998

[51] Int. Cl.[7] .................................................. G06F 17/60
[52] U.S. Cl. ................................ 705/27; 705/26; 705/14
[58] Field of Search ................................ 705/27, 26, 14

[56] References Cited

U.S. PATENT DOCUMENTS

| | | | |
|---|---|---|---|
| 5,664,110 | 9/1997 | Green et al. ........................... | 705/27 |
| 5,694,546 | 12/1997 | Reisman ................................. | 705/26 |
| 5,706,442 | 1/1998 | Anderson et al. ..................... | 705/27 |
| 5,710,887 | 1/1998 | Chelliah et al. ....................... | 705/26 |
| 5,758,328 | 5/1998 | Giovannoli ............................ | 705/27 |
| 5,793,972 | 8/1998 | Shane .................................... | 705/26 |
| 5,794,206 | 8/1998 | Wilkinson et al. ..................... | 705/26 |
| 5,799,157 | 8/1998 | Escallon ................................. | 705/27 |
| 5,809,242 | 9/1998 | Shaw et al. ...................... | 395/200.47 |
| 5,825,881 | 10/1998 | Colvin, Sr. ............................. | 705/26 |
| 5,826,242 | 10/1998 | Montulli ................................. | 705/27 |
| 5,838,790 | 11/1998 | McAuliffe et al. .................... | 380/4 |
| 5,848,397 | 12/1998 | Marsh et al. ........................... | 705/26 |
| 5,855,008 | 12/1998 | Goldhaber et al. ................... | 705/14 |
| 5,864,823 | 1/1999 | Levitan .................................. | 705/27 |
| 5,870,717 | 2/1999 | Wiecha ................................... | 705/26 |
| 5,890,138 | 3/1999 | Godin et al. ........................... | 705/26 |
| 5,897,622 | 4/1999 | Blinn et al. ............................ | 705/26 |
| 5,899,980 | 5/1999 | Wilf et al. ............................. | 705/26 |
| 5,905,973 | 5/1999 | Yonezawa et al. .................... | 705/27 |
| 5,970,469 | 10/1999 | Scroggie et al. ....................... | 705/14 |

OTHER PUBLICATIONS

"Saatchi & Saatchi and First Virtual Holdings Launch the First Animated, Transactional Telecommunications Banner Ad for Bell Atlantic", Business Wire, Dialog File 16:PROMT, Feb. 1997.

*Primary Examiner*—Emanuel Todd Voeltz
*Assistant Examiner*—John W. Hayes
*Attorney, Agent, or Firm*—Quarles & Brady LLP

[57] ABSTRACT

A method for engaging in electronic commerce over the Internet, comprising the steps of: programming a first electronic mail (e-mail) message to include: a description of at least one product available for sale by an electronic commerce (e-commerce) site; a shopper selectable indicia for indicating that the shopper has chosen to purchase the at least one product; and, a shopper activatable link back to the e-commerce site for transmitting a second e-mail message including the shopper's choice to purchase the at least one product; transmitting the e-mail message over the Internet to at least one potential shopper; and, in response to receiving the second e-mail message transmitted back to the e-commerce site by activation of the link by the at least one potential shopper, consummating the purchase of the at least one product by the at least one potential shopper.

21 Claims, 2 Drawing Sheets

ELECTRONIC SOLICITATIONS FOR INTERNET COMMERCE

BACKGROUND OF THE INVENTION

1. Field of the Invention

This invention relates to the field of electronic commerce on the Internet, and in particular, to the generation and use of targeted commercial solicitations over the Internet.

2. Description of Related Art

A retailer interested in enticing customers to purchase products may have an advertisement created and published in a periodical, newspaper, appear on TV or radio, or mailed using a mailing list. For example, a grocer has weekly specials and places ads or flyers in the local newspaper to make potential and current customers aware of these specials. In this process, the grocer must engage the newspaper company and provide advertising input. The newspaper staff then creates the flyer, inserting it into a special advertising section.

An advertising approach utilizing a periodical as a delivery mechanism can only access a subset of the population defined as the subscribers of that periodical. Some understanding of subscriber demographics can be derived, but generally, an advertiser does not know if shoppers are responding to the ad or if items are purchased coincidentally. Newspaper advertising is poorly targeted and lacks the ability to verify shopper responses to advertisements.

On the Internet, the number of electronic commerce (e-commerce) sites is growing daily. At an e-commerce site, a shopper can access an electronic catalog (e-catalog) containing textual, graphical and multimedia based information about specific items. A shopper can select one or more item from an e-catalog, placing them into a virtual shopping cart. Shoppers can use search facilities provided by the e-commerce site to locate items. Once all desired items are located and selected, the shopper may proceed to a checkout process, specifying personal data (if the shopper has not previously registered) such as name, address, credit card numbers, and the like. Upon transaction completion the shopper is provided with delivery instructions or related details.

A significant problem affecting e-commerce site success is the inhibited ability to attract customers to their sites. One solution is to extend the e-commerce site catalog in the form of a solicitation sent to shoppers via electronic mail (e-mail).

E-mail can now be sent to shoppers on the Internet in the form of e-mail solicitations, but shoppers receiving such e-mail solicitations have no way to select items and submit an order without going to the e-commerce site and performing all of the usual steps which are necessary at the site to order the goods or services. The usual steps are sometimes referred to as the order mechanics. Presently, no automated method is known that enables a shopper to receive an electronic advertisement and shop from the advertisement.

SUMMARY OF THE INVENTION

This method extends current e-commerce capabilities by allowing the shopper to fill out and submit an order, directly from the e-mail solicitation. Such an extended capability electronic solicitation is referred to herein as an electronic flyer, or e-flyer. The shopper can select items from the solicitation and terminate the transaction, or alternatively, the shopper can surf to the related e-commerce site and continue shopping.

The e-flyer contains a solicitation or advertisement and enables the extension of e-commerce sites, representing a subset of the respective catalogs of e-commerce sites in the form of solicitations to shoppers. The shopper can automatically shop directly from the e-flyer and/or surf to the related e-commerce site and shop directly at the related e-commerce site, a direct link to the related e-commerce site also being provided in the e-flyer.

E-flyers can be created manually using a software utility for construction purposes. Alternatively, e-flyers can be created automatically and tailored, that is targeted, for specific shoppers based on historical shopper profiles. E-flyers can be distributed electronically via e-mail, acquired from web sites or sent on a channel utilizing push technologies.

Some benefits of such technological enhanced e-flyers include: lower advertising costs; improved customer service; reduced shopping time; greater customer loyalty; tracking of buyer habits; development of customer profiles; and, one to one marketing. Retailers gain a competitive advantage and attract new customers, and at the same time, shoppers have the benefit of a customized shopping service.

A method for engaging in electronic commerce over the Internet, in accordance with an inventive arrangement, comprises the steps of: programming a first electronic mail (e-mail) message to include: a description of at least one product available for sale by an electronic commerce (e-commerce) site; a shopper selectable indicia for indicating that the shopper has chosen to purchase the at least one product; and, a shopper activatable link back to the e-commerce site for transmitting a second e-mail message including the shopper's choice to purchase the at least one product; transmitting the e-mail message over the Internet to at least one potential shopper; and, in response to receiving the second e-mail message transmitted back to the e-commerce site by activation of the link by the at least one potential shopper, consummating the purchase of the at least one product by the at least one potential shopper.

The method can further comprise the step of programming the e-mail message to include descriptions of a subset of a larger inventory of products available for sale by the e-commerce site.

The method can further comprise the steps of: programming the shopper activatable indicia to include, for each of the products in the subset, a first activatable icon for selecting the product for purchase and a second activatable icon for entering a quantity of the product to be purchased; and, including in the second e-mail message data representing information corresponding to the activatable icons as activated.

The method can also further comprise the steps of programming the first e-mail message to include a third activatable icon for accessing a search utility at the e-commerce site and programming the first e-mail message to include a fourth activatable icon for accessing a shopping utility at the e-commerce site.

A computer programmed with a routine set of instructions for generating an electronic mail (e-mail) message for engaging in electronic commerce (e-commerce) over the Internet, in accordance with another inventive arrangement, comprises: means for including in the e-mail message a graphical user interface (GUI), the GUI including a description of at least one product available for sale by an e-commerce site; a shopper selectable indicia for indicating that the shopper has chosen to purchase the at least one product; and, a shopper activatable link back to the e-commerce site for transmitting a second e-mail message including the shopper's choice to purchase the at least one product; means for transmitting the e-mail message over the Internet to at least one potential shopper; and, means operable in response to receiving the second e-mail message transmitted back to the e-commerce site by activation of the link by the at least one potential shopper, consummating the purchase of the at least one product by the at least one potential shopper.

The GUI can include descriptions of a subset of a larger inventory of products available for sale by the e-commerce site.

The GUI can include a first set of activatable icons for selecting the products from the subset of products for purchase and a second set of activatable icons for entering a quantity of the selected products to be purchased.

The GUI can further include an activatable icon for accessing a search utility at the e-commerce site and an icon for accessing a shopping utility at the e-commerce site.

A computer programmed with a routine set of instructions for generating an electronic mail (e-mail) message for engaging in electronic commerce (e-commerce) over the Internet, in accordance with yet another inventive arrangement comprises: means for generating an e-mail message having a graphical user interface (GUI) enabling a recipient of the e-mail message over the Internet to order at least one product from an e-commerce site without logging on to the e-commerce site, the GUI having at least one activatable link for transmitting purchase data back to the e-commerce site; means for transmitting the e-mail message over the Internet to at least one potential shopper; and, means operable in response to receiving the purchase data, transmitted back to the e-commerce site by activation of the link, for consummating the purchase of the at least one product by the at least one potential shopper.

DETAILED DESCRIPTION OF THE PREFERRED EMBODIMENTS

Figure 1:
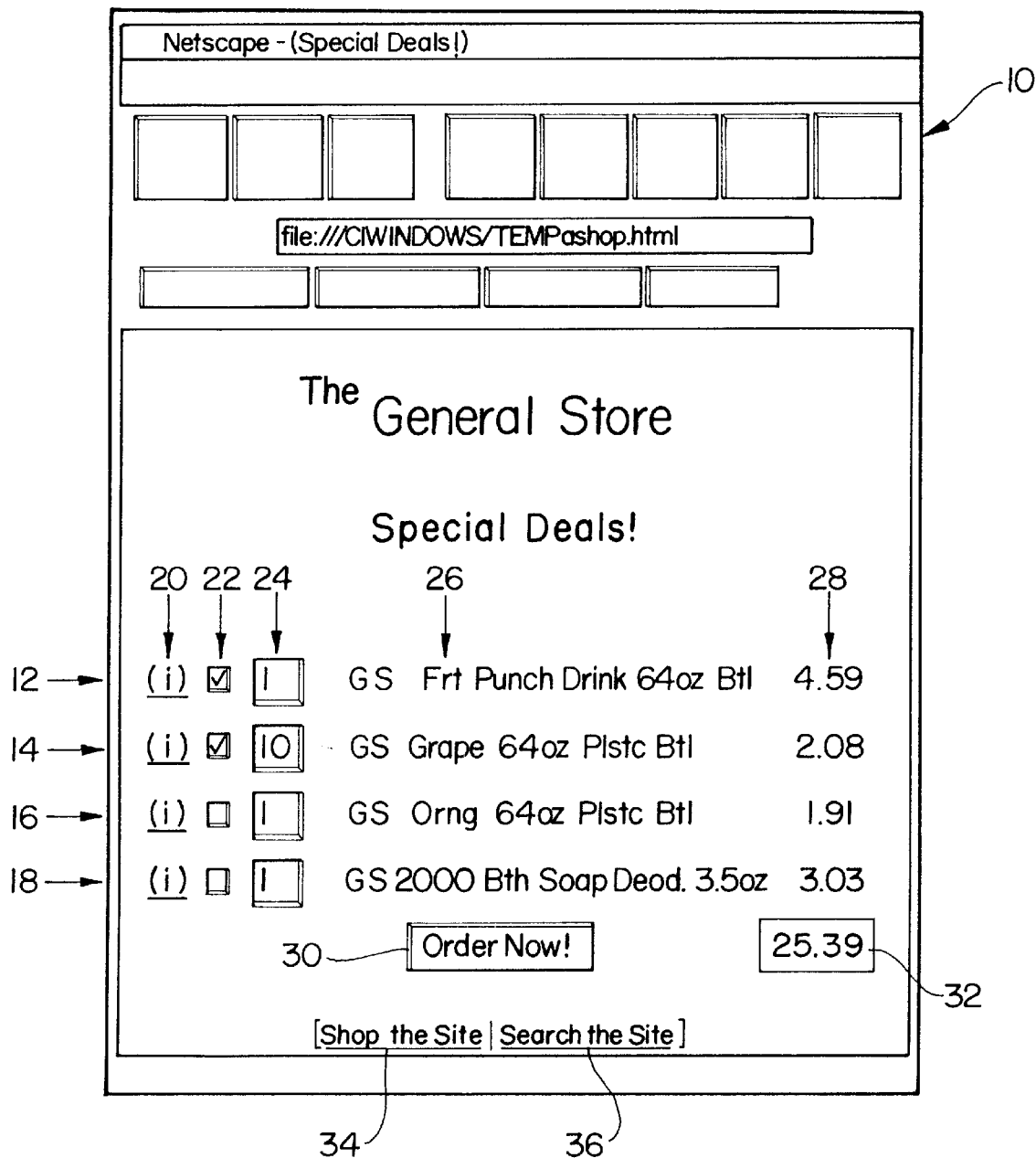
FIG. 1 shows an e-flyer and GUI in accordance with the inventive arrangements.

An e-flyer is a hyper text markup language (HTML) document whose creation is initiated by retailers interested in distributing solicitations through an electronic medium to Internet based shoppers. The e-flyer identifies product names, descriptions and prices and contains control features to link the shopper directly to the e-commerce site. Control features include, for example, a search utility, delivery request, shop at e-commerce site request and customer service link. Product pictures or graphic image files (e.g., gif, .jpg, etc.) can be added to enhance the e-flyer presentation. The e-flyer is multimedia enabled, with optionally embedded elements including, but not limited to audio files (e.g., .wav, au, etc.) and video files (e.g., .mov, mpg, etc.). An exemplary e-flyer 10 is shown in the Figure.

E-flyers can be created manually and automatically. In order to crate an e-flyer manually, an administrator or author interacts with a software utility designed to facilitate e-flyer construction. This utility displays a list of products, prices and graphic images extracted from a product database or e-catalog. The e-flyer author can generate an e-flyer using point and click, drag and drop techniques to select content and organize the format. The resulting e-flyer can appear similar to the flyer sent to shoppers via the postal service, inserted in newspapers or similar to catalog pages. As the final step in this process, the e-flyer author can specify a recipient list selected from a shopper database. Potential recipients can optionally subscribe to or cancel an e-flyer subscription.

Automatic e-flyer construction can yield an equivalent result as compared to the manual process. The automatic e-flyer construction process differs in the respect that rule based software algorithms select e-flyer content. This content may be general or specifically tailored to the intended recipient's preferences or anticipated shopping needs.

E-flyer creation targeting a specific user is made possible through the acquisition and analysis of shopper data. Shopper data can be acquired either by shopper responses using fill-in forms such as during the registration process. Shopper data may also be acquired during visits to an e-commerce site where that user is known, having logged in with a user id or by responding to an e-flyer. While at the e-commerce site, shopper behaviors can be logged such as web pages visited, actions taken, items purchased, etc. Behaviors can be categorized and stored in a database. Shoppers may explicitly state preferences in forms provided at the e-commerce site. Responses may then be used to filter future content presented to the shopper in the e-flyer.

Assume, for example, that a shopper has indicated a preference for red shoes in a form provided by the e-commerce based SuperShoe site. The same shopper explicitly stated they wanted to be notified only once every six months (anticipated replenishment or shoe replacement). A reminder in the form of an e-flyer is automatically created when the two conditions, namely red shoes on sale and six months elapsed are met. The red shoe preference is matched against tagged HTML content in the SuperShoe database and a shopper specific solicitation results. To further strengthen the shopper's profile, that shoppers response or lack of a response to the e-flyer is noted in the database.

E-flyers can be distributed electronically to shoppers in a variety of ways. E-mail provides a common mechanism for e-flyer distribution via mail serves such as SMTP, POP3 and the like. E-flyers may also be distributed using emerging Push Technologies. The Pointcast service represents such an emerging technology. Users select the type of content and the conditions under which that content is sent, such as time period. Servers push information to users based on such definitions. In the future, a shopper may select to access a service that provides channels dedicated to the transmission of e-flyers.

A further possibility for e-flyer access includes the placement of e-flyers at related web sites. For example, a potential shopper visits the web site of a famous sporting event, for example a golf tournament, where a sporting goods business has placed an e-flyer, perhaps for golf balls or special clubs or souvenir apparel related to that event or related events or sponsors of the events. The potential shopper views the e-flyer and may elect to purchase one or more items. This buying decision has been prompted without the potential shopper explicitly visiting the e-commerce site of the sporting goods business.

Once an e-flyer is received the shopper may perform a transaction. The e-flyer is an HTML based document with extended capabilities requiring a Web Browser such as Netscape® Communicator version 4.0 or later. A shopper receiving the e-flyer shown in the Figure can perform any one or more of the following actions.

The first action is to purchase one or more of the items featured in the e-flyer. The special deals shown in e-flyer 10 are three different flavors a sports beverage under the house brand GS of the General Store. Each product is a line item in a list. The fruit punch flavor is line item 12, the grape flavor is line item 2, and the orange flavor is line item 3. GS brand soap is the fourth line item. Each line item has a column entry 20 for item number, a column entry 22 for indicating a choice to purchase, a column entry 24 for quantity, a column entry 26 for product description and a column entry 28 for price. In the e-flyer 10 the shopper has chosen to purchase items 1 and 2, by clicking on the empty rectangle in column 22 to insert a check mark as shown, or other symbol. One container of fruit punch flavor and 10 containers of grape flavor are selected in column 24. Optionally, the e-flyer can provide a running total in block 32, depending upon the sophistication of the e-flyer. When the shopper is ready, the Order Now button 30 is activated, which automatically results in the purchase. Since the e-flyer is created based on information in the shopper data base of the General Store, all of the credit and delivery information is already available and need not be provided. The order is automatically transmitted back to the e-commerce site for accounting and fulfillment of the order. This may include the e-commerce site returning an e-mail confirmation, perhaps with a product pickup or delivery schedule.

The e-flyer provides the shopper with several additional options. A first option is to activate the Search the Site button 36, which allows the shopper to enter key word terms such as "ketchup" to locate a subset of the e-commerce site inventory from which the shopper can isolate further selections. Once a shopper has selected the set of desired items, the order may be submitted to the e-commerce site for procurement by clicking on the Order Now button. A second option is to activate the Shop the Site button 34, enabling the shopper to shop directly at the e-commerce site and browse the available inventory directly. Any items selected from the e-flyer are part of the shopper's virtual shopping cart. Shoppers may already be registered, or may be first time shoppers who need to register, using the site's registration process, providing data such as name, address, billing information and the like. Once the shopper is logged in they may select additional items to be combined along with the e-flyer selections made before accessing the e-commerce site. This combined set of items would comprise the shopper's order.

A third option is to save the e-flyer for further purchases as long as the special deals are available. In the event the shopper places an order after the special deals have expired, the e-flyer programming or the e-commerce site can generate a message to the shopper explaining that the offer has expired. A fourth option is to delete the e-flyer to preclude further purchases. Finally, the e-flyer can itself be programmed to delete itself or automatically generate an expiration warning at the proper time.

The inventive arrangements described herein provide for the first time an e-mail message having a graphical user interface (GUI) enabling a recipient of said e-mail message over the Internet to order products from an e-commerce site without logging on to the e-commerce site. The GUI has at least one activatable link for transmitting purchase data back to said e-commerce site. The GUI can also be provided with activatable icons for purchasing one or more products when more than one product is available, and further activatable icons for entering quantities of the selected product or products to be purchased. The GUI is advantageously provided with another activatable icon for initiating a data transmission back to the e-commerce site, for example a second e-mail message, including information representing purchase data entered by the shopper. Finally, the GUI can also be provided with an activatable icon for accessing a search utility at said e-commerce site and an activatable icon for accessing a shopping utility at said e-commerce site.

A computer, for example one associated with the e-commerce site, such as the computer in which the e-mail message and GUI are generated, includes means for transmitting the e-mail message over the Internet to at least one potential shopper and means operable in response to receiving the purchase data, transmitted back to the e-commerce site by activation of the respective icon, for consummating the purchase of the product or products selected by the shopper.

Figure 2:
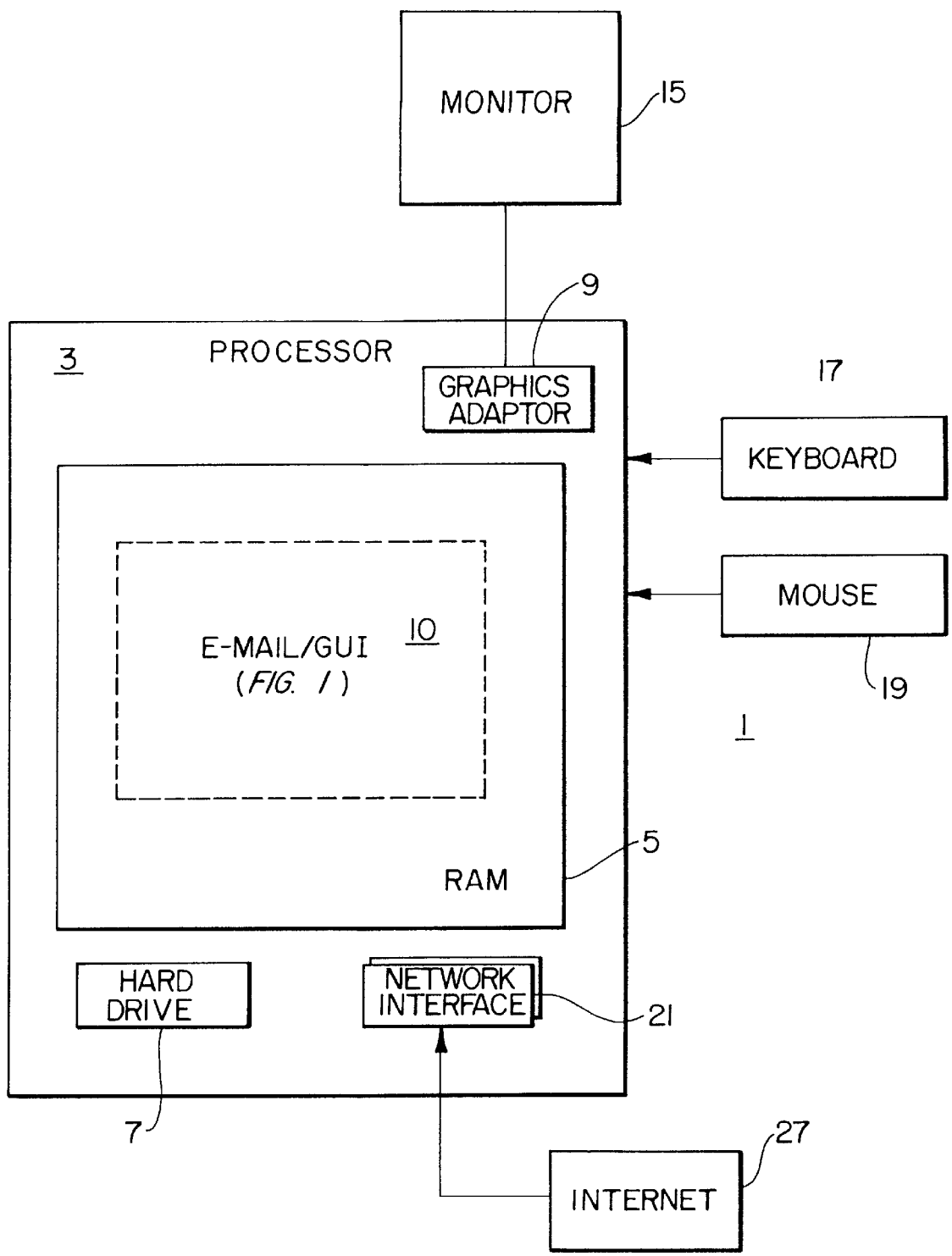
FIG. 2 shows a block diagram of a computer programmed with a routine set of instructions for generating the e-flyer and GUI shown in FIG. 1.

A computer system 1 is shown in block diagram form in FIG. 2. The computer system is programmed with a set of instructions stored in a physical medium, for example a hard drive 7 and/or a random access memory (RAM) 5 of a central processor 3, for generating the e-mail message 5 and GUI shown in FIG. 1. The computer system 1 has a graphics adapter 9 that generates the GUI display explained above and shown in FIG. 1. The computer system comprises one or more network interface circuits or cards 21, for connecting to the Internet 27 directly, or through intermediate local area networks (LAN) and/or wide area networks (WAN), not shown for purposes of clarity. Two examples of circuit or card 21 are a modem or an ISDN interface. The computer system further comprises a monitor 15, a keyboard 17 and a mouse 19. The dashed line box shown in random access memory 5 represents the process resulting in the generation of the e-mail message and GUI shown in FIG. 1, and is intended to represent a programmed routine of instructions, in accordance with the inventive arrangements, stored in a physical medium embodied by hard drive 7 and loaded into another physical medium embodied by random access memory 5. The programmed routine of instructions implements the steps of the configuring process as shown and described herein.

What is claimed is:

1. A method for engaging in electronic commerce over the Internet, comprising the steps of:

programming a first electronic mail (e-mail) message to include: a description of at least one product available for sale by an electronic commerce (e-commerce) site; a shopper selectable indicia for indicating that said shopper has chosen to purchase said at least one product; and, a shopper activatable link back to said e-commerce site for directly transmitting to said e-commerce site a second e-mail message including said shopper's choice to purchase said at least one product;

transmitting said first e-mail message over the Internet from said e-commerce site directly to at least one potential shopper; and, in response to receiving said second e-mail message transmitted back to said e-commerce site by activation of said link by said at least one potential shopper, consummating said purchase of said at least one product by said at least one potential shopper.

2. The method of claim 1, comprising the step of programming said e-mail message to include descriptions of a subset of a larger inventory of products available for sale by said e-commerce site.

3. The method of claim 2, comprising the steps of:

programming said shopper activatable indicia to include, for each said product in said subset, a first activatable icon for selecting said product for purchase and a second activatable icon for entering a quantity of said product to be purchased; and, including in said second e-mail message data representing information corresponding to said activatable icons as activated.

4. The method of claim 3, comprising the step of programming said first e-mail message to include a third activatable icon for accessing a search utility at said e-commerce site.

5. The method of claim 4, comprising the step of programming said first e-mail message to include a fourth activatable icon for accessing a shopping utility at said e-commerce site.

6. The method of claim 3, comprising the step of programming said first e-mail message to include a third activatable icon for accessing a shopping utility at said e-commerce site.

7. The method of claim 1, comprising the steps of:
programming said shopper activatable indicia to include a first activatable icon for selecting said at least one product for purchase and a second activatable icon for entering a quantity of said at least one product to be purchased; and,
including in said second e-mail message data representing information corresponding to said activatable icons as activated.

8. The method of claim 1, comprising the step of programming said first e-mail message to include an activatable icon for accessing a search utility at said e-commerce site.

9. The method of claim 1, comprising the step of programming said first e-mail message to include an activatable icon for accessing a shopping utility at said e-commerce site.

10. The method of claim 1, comprising the steps of:
programming said first e-mail message to include a first activatable icon for accessing a search utility at said e-commerce site; and,
programming said first e-mail message to include a second activatable icon for accessing a shopping utility at said e-commerce site.

11. A computer programmed with a routine set of instructions for generating an electronic mail (e-mail) message for engaging in electronic commerce (e-commerce) over the Internet, the computer comprising:
means for including in said first e-mail message a graphical user interface (GUI), said GUI including a description of at least one product available for sale by an e-commerce site; a shopper selectable indicia for indicating that said shopper has chosen to purchase said at least one product; and, a shopper activatable link back to said e-commerce site for directly transmitting from said shopper to said e-commerce site a second e-mail message including said shopper's choice to purchase said at least one product;
means for transmitting said first e-mail message over the Internet from said e-commerce site directly to at least one potential shopper; and,
means operable in response to receiving said second e-mail message transmitted back to said e-commerce site by activation of said link by said at least one potential shopper, consummating said purchase of said at least one product by said at least one potential shopper.

12. The computer of claim 11, wherein said GUI includes descriptions of a subset of a larger inventory of products available for sale by said e-commerce site.

13. The computer of claim 11, wherein said GUI includes a first activatable icon for selecting said products from said subset of products for purchase and a second activatable icon for entering a quantity of said selected products to be purchased.

14. The computer of claim 13, wherein said GUI includes a third activatable icon for accessing a search utility at said e-commerce site.

15. The computer of claim 14, wherein said GUI includes a fourth activatable icon for accessing a shopping utility at said e-commerce site.

16. The computer of claim 13, wherein said GUI includes a third activatable icon for accessing a shopping utility at said e-commerce site.

17. The computer of claim 11, wherein said GUI includes a first activatable icon for selecting said at least one product for purchase and a second activatable icon for entering a quantity of said at least one product to be purchased.

18. The computer of claim 11, wherein said GUI includes an activatable icon for accessing a search utility at said e-commerce site.

19. The computer of claim 11, wherein said GUI includes an activatable icon for accessing a shopping utility at said e-commerce site.

20. The computer of claim 11, wherein said GUI includes:
a first activatable icon for accessing a search utility at said e-commerce site; and,
a second activatable icon for accessing a shopping utility at said e-commerce site.

21. A computer programmed with a routine set of instructions for generating an electronic mail (e-mail) message for engaging in electronic commerce (e-commerce) over the Internet, the computer comprising:
means for generating an e-mail message having a graphical user interface (GUI) enabling a recipient of said e-mail message over the Internet to order at least one product from an e-commerce site without logging on to said e-commerce site, said GUI having at least one activatable link for transmitting purchase data directly back to said e-commerce site;
means for transmitting said e-mail message over the Internet from said e-commerce site directly to at least one potential shopper; and,
means operable in response to receiving said purchase data, transmitted back to said e-commerce site by activation of said link, for consummating said purchase of said at least one product by said at least one potential shopper.

* * * * *